United States Patent [19]

Teller et al.

[11] Patent Number: 5,746,363
[45] Date of Patent: May 5, 1998

[54] REMOVABLE CONTAINER ASSEMBLY

[75] Inventors: Bill Teller, Farmington; Pete McCulloch, Gross Point Woods; Vaughn J. Drobnich, Rochester; Jeffrey Lee Goins, Omer, all of Mich.

[73] Assignee: Lear Corporation, Southfield, Mich.

[21] Appl. No.: 674,432

[22] Filed: Jul. 2, 1996

[51] Int. Cl.⁶ .................................................. B60N 3/10
[52] U.S. Cl. .......................... 224/547; 224/275; 224/926
[58] Field of Search ................................. 224/279, 281, 224/547, 926, 275

[56] References Cited

U.S. PATENT DOCUMENTS

| | | |
|---|---|---|
| 2,435,151 | 1/1948 | Morgan .............................. 224/281 X |
| 4,813,582 | 3/1989 | Henricksen et al. . |
| 4,826,058 | 5/1989 | Nakayama . |
| 4,877,164 | 10/1989 | Baucom ............................... 224/926 |
| 4,953,771 | 9/1990 | Fischer et al. . |
| 5,024,412 | 6/1991 | Elwell . |
| 5,044,577 | 9/1991 | Spearman . |
| 5,180,089 | 1/1993 | Suman et al. . |
| 5,253,838 | 10/1993 | Spykerman . |
| 5,297,709 | 3/1994 | Dykstra et al. . |
| 5,383,586 | 1/1995 | Leivan . |
| 5,395,084 | 3/1995 | Ikuma . |
| 5,489,055 | 2/1996 | Levy . |
| 5,509,633 | 4/1996 | Ruster et al. ........................... 224/926 |

*Primary Examiner*—Renee S. Luebke
*Attorney, Agent, or Firm*—Howard & Howard

[57] ABSTRACT

A removable container assembly comprised of a container portion and a support portion for supporting the container portion from a support structure. The support portion includes a latch mechanism which comprises a latch portion and a release portion. The container assembly is an integral unitary member. The latch portion is normally in latched engagement with an abutment extending from the support structure which prevents the support portion from being removed from the support structure. The release portion manually rotates the latch portion about an integral connector from the latched engagement for removal of the container assembly from the support structure.

19 Claims, 3 Drawing Sheets

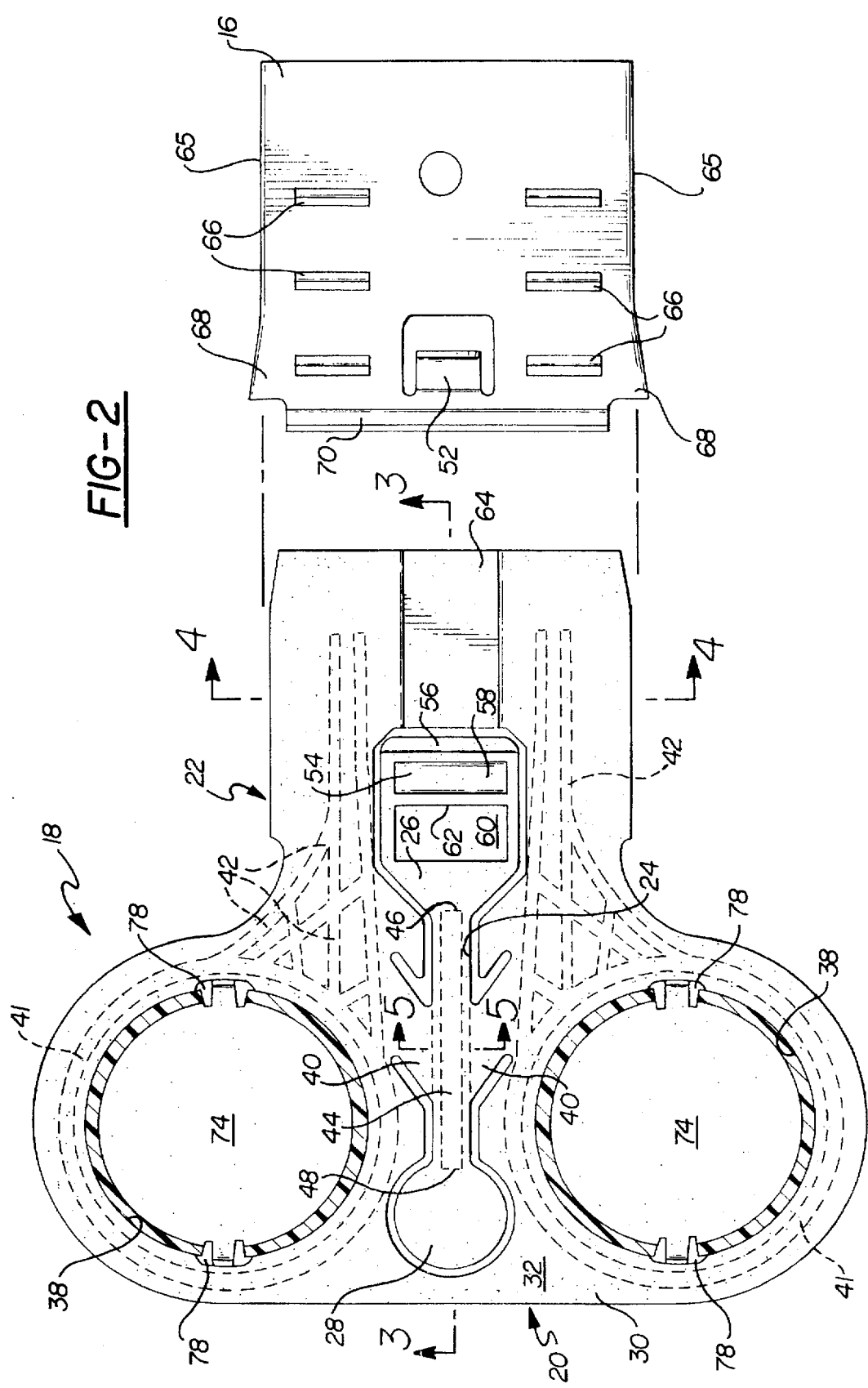

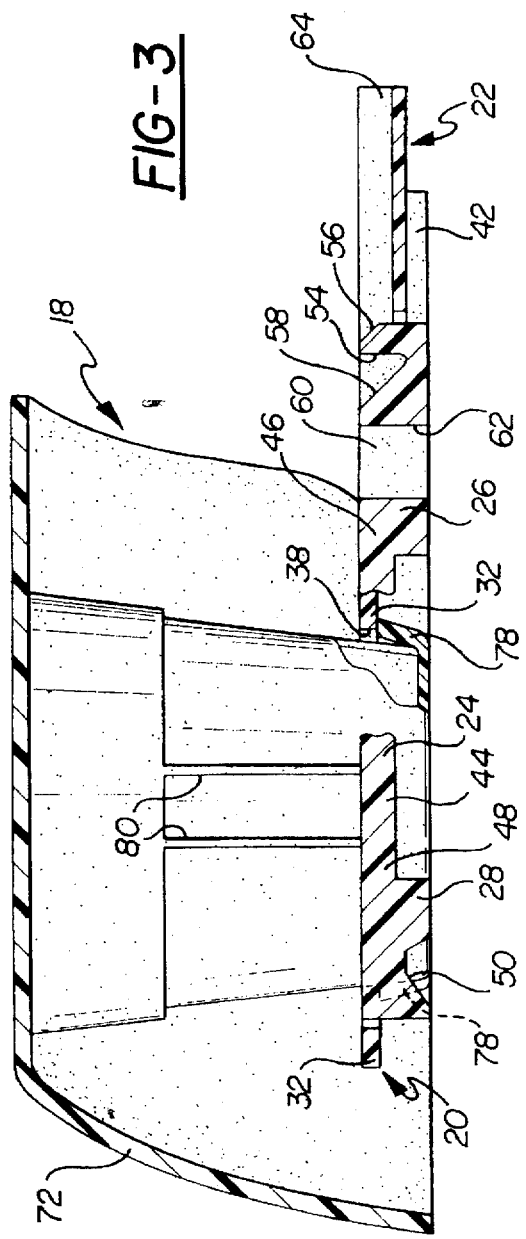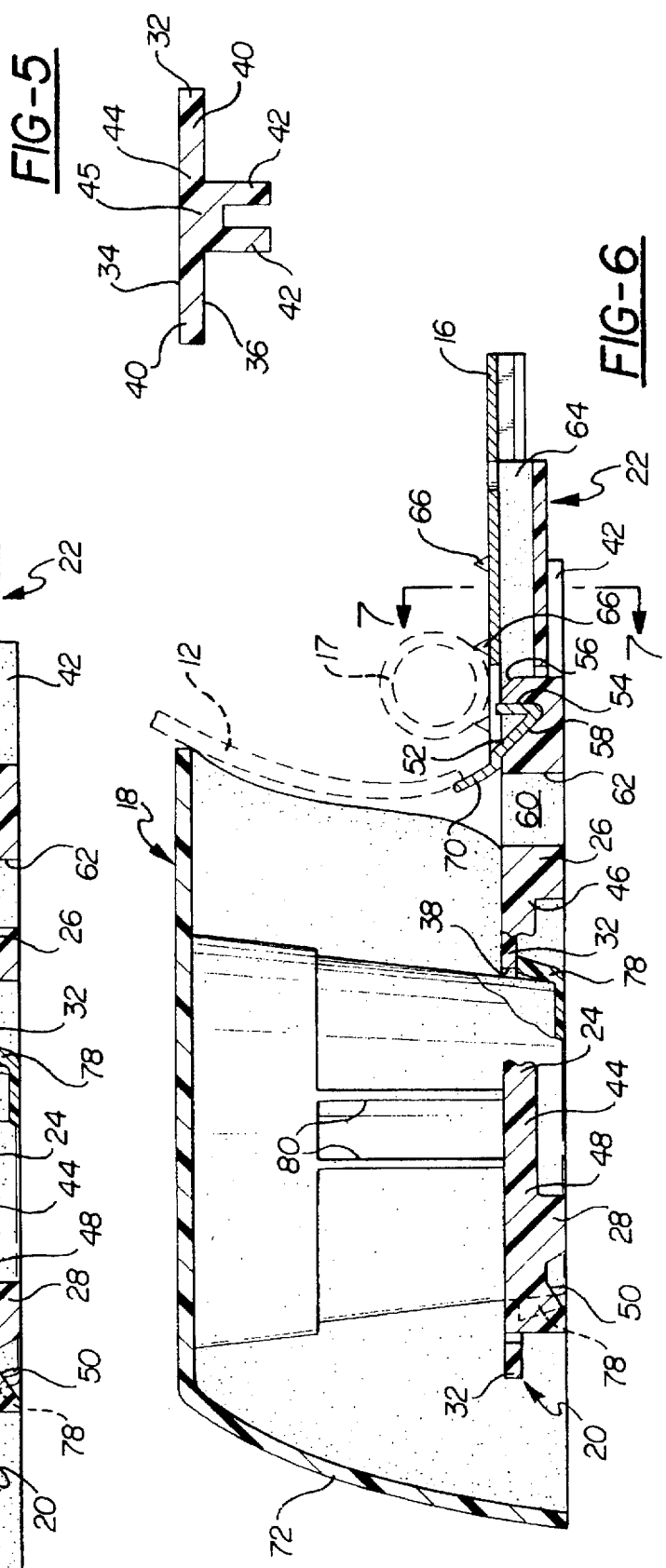

REMOVABLE CONTAINER ASSEMBLY

TECHNICAL FIELD

The subject invention relates to automotive container holders which are capable of retaining various devices, i.e., cupholders, package trays, ash trays, writing pads, cellular phone mounts, etc., in a secure position during vehicle travel. Specifically, the preferred embodiment of the subject invention relates to a cupholder housing fixedly secured within a removable container assembly which can be readily removed from a vehicle.

BACKGROUND OF THE INVENTION

Most current cupholder housings are either unitary cupholder housings of fixed dimensions which are integrally formed with another component of the vehicle or multipiece retractable cupholder housings which fold and/or retract.

The unitary cupholder housings are typically formed into a center console, an armrest, a dashboard, or the inside surface of a glove box lid. Examples of such cupholder housings can be found in U.S. Pat. Nos. 5,150,946 to Marfilius et al. and U.S. Pat. No. 5,275,779 to Marfilius et al., both of which are assigned to the assignee of the present invention. These unitary cupholders usually retain a cup or mug in position satisfactorily during vehicle travel; however, they cannot be concealed or removed from the vehicle and can be very difficult to clean.

The retractable cupholder housings may extend from a center console, a dashboard, an armrest assembly, an interior door panel or any other appropriate location. Examples of such cupholder housings can be found in U.S. Pat. Nos. 5,096,152 to Christiansen et al., U.S. Pat. No. 5,104,184 to Kwasnik et al., U.S. Pat. No. 5,104,185 to Christiansen et al., U.S. Pat No. 5,104,186 to Kwasnik et al., and U.S. Pat. No. 5,131,716 to Kwasnik et al., all of which are assigned to the assignee of the present invention. These mechanisms usually retract and/or collapse within their corresponding support surfaces and typically comprise numerous pieces which are difficult and expensive to manufacture and may have a tendency to break or fracture.

U.S. Pat. No. 5,383,586 to Leivan discloses a third type of cupholder housing, specifically, a removable cupholder housing. The Leivan '586 cupholder housing comprises of a flat rectangular cupholder having two distinct cupholding sides and a support structure for supporting the cupholder. The cupholder housing is held within the support structure simply by the frictional forces between the cupholder housing and the support structure.

SUMMARY OF THE INVENTION AND ADVANTAGES

The subject invention relates to a removable container assembly comprising a container portion and a support portion for supporting the container portion from a support structure. The support portion includes a latch portion normally in latched engagement with the support structure for preventing the support portion from being removed from the support structure. The assembly further includes a release portion for manually moving the latch portion from the latched engagement for removal of the assembly from the support structure.

Accordingly, the subject invention provides a container assembly which can retain a cupholder housing and satisfactorily retain a cup, mug, can, or glass during aggressive vehicle travel. The container assembly is easily removable by simply actuating a release lever and sliding the container assembly out of engagement with the support structure.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a plan view, with the cupholder housing shown in cross-section, of the subject invention in exploded relationship with a support structure;

FIG. 3 is a cross sectional view taken along line 3—3 of FIG. 2;

FIG. 5 is a cross sectional view taken along line 5—5 of FIG. 2.

FIG. 6 is a view similar to FIG. 3 but showing the support structure attached thereto.

DETAILED DESCRIPTION OF THE PREFERRED EMBODIMENT

Figure 1:
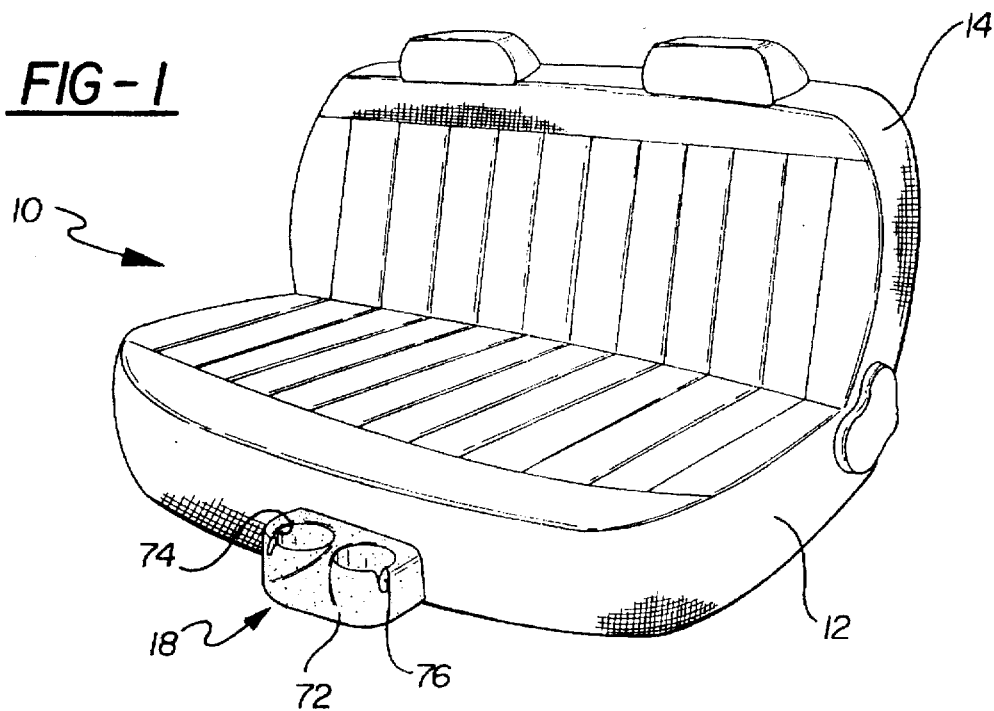
FIG. 1 is a perspective view of an automotive seating assembly utilizing the subject invention.
Figure 4:
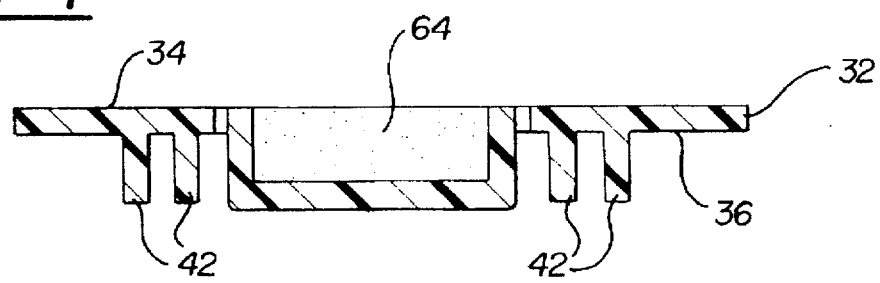
FIG. 4 is a cross sectional view taken along line 4—4 of FIG. 2.

Referring to the Figures, wherein like numerals indicate like or corresponding parts throughout the several views, an automotive seating assembly is generally shown at 10. The seating assembly 10 includes a seat bottom 12 and a seat back 14 pivotally attached to the seat bottom 12. A support structure 16 is fixed, preferably welded, to the underside of the seat bottom 12. Specifically the support structure 16 is welded to a seat bottom frame 17, as shown in phantom at FIG. 6.

A removable container assembly, generally designated at 18, is retained by the support structure 16 at the underside of the seat bottom 12. As best shown in FIG. 2, the removable container assembly 18 comprises a container portion, generally designated at 20, and a support portion, generally designated at 22, for supporting the container portion 20 from the support structure 16. The support portion 22 includes a latch mechanism 24 which comprises a latch portion 26 and a release portion 28.

The portions of the container assembly 18, which include the container portion 20, support portion 22, latch portion 26, and release portion 28 are integral portions of a unitary member 30. Specifically, the unitary member 30 comprises a sheet 32 having top 34 and bottom 36 sides whereby the portions 20, 22, 26, 28 are a part of the sheet 32. The container portion 20 includes a pair of retainer rings 38 defined by circular openings in the sheet 32. The container portion 20 may include more than two retainer rings 38 or only one retainer ring 38 or any other configured receptacle without deviating from the scope of the subject invention. The support portion 22 is a flat substantially rectangular surface that extends laterally from the container portion 20. The distal ends of the support portion 22 taper inwardly to allow for easier insertion into the support structure 16.

The latch portion 26 is isolated from the sheet 32 at the center of the support portion 22 as is the release portion 28 isolated from the sheet 32 between the retainer rings 38 of the container portion 20. In fact the entire latch mechanism 24 is molded in isolation from the sheet 32 except for an integral connector 40 which integrally connects and retains the latch mechanism 24 to the sheet 32 at a point about midway of the length of the latch mechanism 24. To add rigidity to the sheet 32, a plurality of strengthening ribs 41, 42 extend from the bottom side 36 of the sheet 32. Specifically, some ribs 41 of the strengthening ribs encircle the retaining rings 38, while the remaining ribs 42 extend laterally along the latch mechanism 24 and into the support portion 22. As best shown in FIGS. 3 and 6, the effective thickness of the latch mechanism 24 is equal to the combined thickness of the sheet 32 and the ribs 41, 42.

The unitary member 30 of the subject invention is molded of a homogeneous thermoplastic material. However, as well known to those skilled in the art, the unitary member 30 may be made of any suitable material.

The latch mechanism 24 also includes a beam 44 having first 46 and second 48 ends. As best shown in FIG. 5, the beam 44 includes the sheet 32, a pair of ribs 42, and a thickened mid section 45 which extends the full distance between the ends 46, 48. The thickened mid section 45 is located below the sheet 32 and between the ribs 42. The latch portion 26 is affixed at the first end 46 and the release portion 28 is affixed at the second end 48. The integral connector 40 is disposed between the ends 46, 48 of the beam 44 whereby the release portion 28 may be manually rotated about the connector 40 to rotate the latch portion 26 out of latched engagement with the support structure 16. In the preferred embodiment, the connector 40 is located on both sides of the beam 44 and is in the shape of an arrowhead too accommodate torsional forces upon rotation of the release portion 28. The connector 40 could be designed of any shape and connected by any means to the beam 44 so long as the connector 40 allows for pivotal movement of the latch mechanism 24 about the connecting axis of the connector 40. The release portion 28 includes a finger recess 50 (see FIGS. 3 and 6) for easier manual manipulation of the latch portion 26.

The latch portion 26, of the latch mechanism 24, includes at least one latch recess 54 or 60 which receives an abutment 52 extending from the support structure 16. Preferably the subject invention includes two latch recesses 54, 60 to provide added versatility to the design. A first latch recess 54 includes a ramp 56 and a reverse catch 58 and a second latch recess 60 defines a cavity 62 in the latch portion 26. The number, shape, and size of latch recesses formed within the latch portion 26 is entirely dependent upon the specific application. The support portion 22 also includes a channel 64 extending therein to the latch portion 26. This channel 64 accommodates movement of the abutment 52 to the latch portion 26 during mounting of the container assembly 18 to the support structure 16. The strengthening ribs 42 extend parallel and alongside the channel 64.

As installed, the latch portion 26 is normally in latched engagement with the abutment 52 of the support structure 16 for preventing the support portion 22 from being removed from the support structure 16. To remove the container assembly 18, a user actuates the release portion 28 to manually pivot the latch portion 26 out of the latched engagement. The container assembly 18 may then be removed from the support structure 16.

Figure 7:
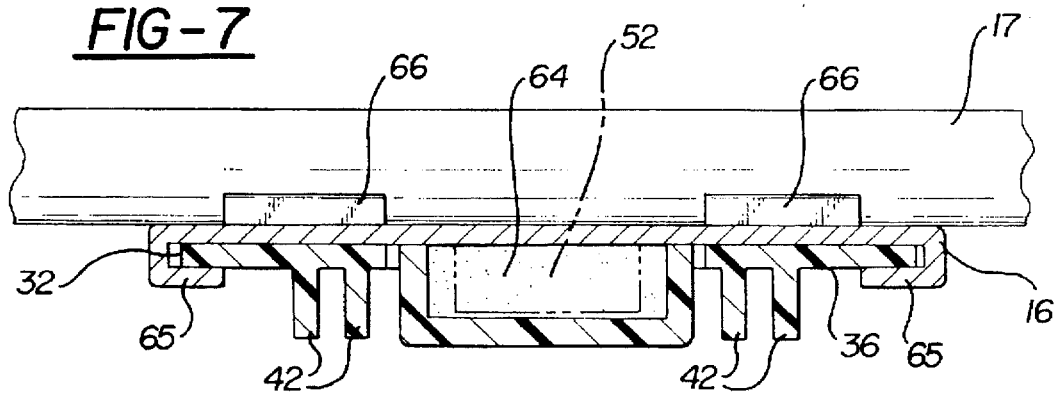
FIG. 7 is a cross sectional view taken along line 7—7 of FIG. 6.

The support structure 16 may be of any suitable material, shape, or size so long as an abutment 52 extends therefrom for locking engagement into the latch portion 26. The support structure 16 could even be the seat bottom frame itself. As best shown in FIGS. 2, 6, and 7, the support structure 16 contemplated for the subject invention is a metal C-shaped support structure 16 that is welded to the under side of the seat bottom frame 17. A pair of turned under sides 65 create the C-shaped entrance which support the distal ends of the support portion 22. A number of locating guides 66 assist an installer in accurately mounting the support structure 16 to the seat bottom frame 17. The C-shaped entrance of the support structure 16 has outwardly flared side portions 68 and an upwardly turned top 70 which allows for easier engagement of the support portion 22. The abutment 52 extends downwardly from within the center of the support structure 16.

During installation of the container assembly 18, a user aligns the support portion 22 with the entrance of the support structure 16. As the user pushes the container assembly 18 inwardly, the abutment 52 slides within the channel 64 until it contacts the ramp 56 of the first latch recess 54. The abutment 52 then pushes the latch portion 26 downwardly and allows the abutment 52 to engage the reverse catch 58. On certain applications, the container assembly 18 can be moved further into the support structure 16. Hence, the abutment 52 would slide along the reverse catch 58 and again push the latch portion 26 downwardly until the abutment 52 engaged the cavity 62 within the second latch recess 60. As discussed above, a user can remove the container assembly 18 by simply actuating the release portion 28 upwardly which moves the latch portion 26 downwardly out of engagement with the abutment 52. The user can then easily slide the container assembly 18 out of engagement with the support structure 16.

As discussed above, any number of devices may be retained within the removable container assembly 18, i.e., cupholders, package trays, ash trays, writing pads, cellular phone mounts, etc. The preferred embodiment of the subject invention discloses a cupholder housing 72 fixedly secured within the removable container assembly 18. Specifically, the cupholder housing 72 is disposed within the retainer rings 38 and is the actual support surface for a cup, mug, can or glass (not shown). The cupholder housing 72 of the subject invention is cup shaped with smooth side walls that define an opening 74 therein. The opening 74 is of sufficient size to retain a standard size cup, can, or glass. As shown in FIG. 1, a slot 76 is formed within the opening 74 which adequately retains a handle on a mug or the like (not shown). The cupholder housing 72 includes a plurality of snap tabs 78 for snapping into engagement within the retainer rings 38 and retaining the cupholder housing 72 in the retainer rings 38. The cupholder housing 72 also includes a number of stops 80 for limiting movement of the cupholder housing 72 into the retainer rings 38. As best shown in FIGS. 3 and 6, the retainer rings 38 are locked between the tabs 78 and the stops 80 for permanent engagement of the cupholder housing 72 within the retainer rings 38 of the container portion 20. In general, the cupholder housing 72 may be artistically shaped in any suitable manner and colored any suitable color which conforms to the ergonomics of the interior of a vehicle.

FIG. 5 is a cross sectional view taken along line 5—5 of FIG. 2.

FIG. 6 is a view similar to FIG. 3 but showing the support structure attached thereto; and FIG. 7 is a cross sectional view taken along line 7—7 of FIG. 6.

The invention has been described in an illustrative manner, and it is to be understood that the terminology which has been used is intended to be in the nature of words of description rather than of limitation.

Obviously, many modifications and variations of the present invention are possible in light of the above teachings. For example, while the preferred embodiment of the invention has been described having a cupholder housing, the cupholder housing can be a container/receptacle housing of any type suitable for many purposes. It is, therefore, to be understood that within the scope of the appended claims, the invention may be practiced otherwise than as specifically described.

What is claimed is:

1. A removable container assembly comprising;

a container portion;

a support portion for supporting said container portion from a support structure;

said support portion including a latch portion normally in latched engagement with the support structure for preventing said support portion from being removed from the support structure;

a release portion for manually moving said latch portion from said latched engagement for removal of said assembly from the support structure and a beam having first and second ends with said latch portion disposed at said first end and said release portion disposed at said second end.

2. An assembly as set forth in claim 1 wherein all of said portions are integral portions of a unitary member.

3. An assembly as set forth in claim 2 wherein said unitary member is a homogeneous thermoplastic material.

4. An assembly as set forth in claim 2 wherein said latch and release portions are integral with said unitary member by an integral connector located between said beam and said unitary member.

5. An assembly as set forth in claim 4 wherein said release portion includes a finger recess for manual manipulation thereof.

6. An assembly as set forth in claim 4 wherein said connector is disposed between said ends of said beam whereby said release portion may be manually rotated about said connector to rotate said latch portion out of latched engagement with the support structure.

7. An assembly as set forth in claim 6 wherein said connector is in the shape of an arrowhead too accommodate torsional forces upon rotation of said release portion.

8. An assembly as set forth in claim 4 wherein said latch portion includes at least one latch recess for receiving an abutment extending from the support structure.

9. An assembly as set forth in claim 8 wherein said latch portion includes a plurality of latch recesses.

10. An assembly as set forth in claim 9 wherein at least one of said latch recess includes a ramp and reverse catch.

11. An assembly as set forth in claim 8 wherein said support portion includes a channel extending therein to said latch portion for accommodating movement of the abutment to said latch portion during mounting of said assembly to the support structure.

12. An assembly as set forth in claim 11 wherein said container portion defines at least one retainer ring.

13. An assembly as set forth in claim 12 wherein said unitary member comprises a sheet having top and bottom sides, and a plurality of strengthening ribs extending from said bottom side of said sheet.

14. An assembly as set forth in claim 13 wherein said strengthening ribs encircle said at least one retainer ring and extend along and laterally of said beam and said channel.

15. An assembly as set forth in claim 14 wherein the thickness of said beam is equal to the combined thickness of said sheet and said ribs.

16. An assembly as set forth in claim 12 wherein said retainer ring includes a cupholder housing disposed therein.

17. An assembly as set forth in claim 16 wherein said cupholder housing includes a plurality of snap tabs for snapping into engagement within said retainer ring and retaining said housing in said retainer ring.

18. An assembly as set forth in claim 17 wherein said cupholder housing includes stops for limiting movement of said housing into said ring whereby said ring is retained between said tabs and said stops.

19. An assembly as set forth in claim 18 wherein said cupholder housing is cup shaped with side walls and said side walls define an opening therein above each of said tabs.

* * * * *